United States Patent [19]
More et al.

[11] Patent Number: 4,534,791
[45] Date of Patent: Aug. 13, 1985

[54] PROCESS FOR TREATING SILICON AND FERROSILICON WITH SLAG

[75] Inventors: Anton More, Burghausen, Fed. Rep. of Germany; Winfried Lang, Ach, Austria; Rudolf Riedle, Burghausen, Fed. Rep. of Germany; Herbert Straussberger; Willi Streckel, both of Mehring-Öd, Fed. Rep. of Germany

[73] Assignee: Wacker-Chemie GmbH, Munich, Fed. Rep. of Germany

[21] Appl. No.: 635,794

[22] Filed: Jul. 30, 1984

[30] Foreign Application Priority Data

Aug. 29, 1983 [DE] Fed. Rep. of Germany ....... 3331046

[51] Int. Cl.$^3$ ............................................. C22B 4/00
[52] U.S. Cl. ............................ 75/10 R; 75/11; 75/53; 75/58; 75/257
[58] Field of Search ............ 75/10 R, 11, 12, 53, 75/58, 257; 148/26

[56] References Cited

U.S. PATENT DOCUMENTS 3,959,031  5/1976  More ............................ 148/26
4,248,631  2/1981  More ............................ 75/53
4,290,809  9/1981  Loane ........................... 75/53

Primary Examiner—Peter D. Rosenberg
Attorney, Agent, or Firm—Collard, Roe & Galgano

[57] ABSTRACT

The invention relates to a process for treating elemental silicon and ferrosilicon with slag having the following analytical composition:

| | |
|---|---|
| $K_2O$ | from 2 to 13% by weight |
| $Na_2O$ | from 0 to 2% by weight |
| $\Sigma\ K_2O + Na_2O$ | from 2 to 13% by weight |
| $SiO_2$ | from 45 to 72% by weight |
| $Al_2O_3$ | from 0 to 30% by weight |
| $\Sigma\ SiO_2 + Al_2O_3$ | from 60 to 78% by weight |
| $CaO$ | from 0 to 30% by weight |
| $MgO$ | from 0 to 30% by weight |
| $\Sigma\ CaO + MgO$ | from 15 to 30% by weight |
| $CaF_2$ | from 0 to 10% by weight |
| $MgF_2$ | from 0 to 10% by weight |
| $\Sigma\ CaF_2 + MgF_2$ | from 0 to 10% by weight |
| $\Sigma\ CaO + MgO + CaF_2 + MgF_2$ | from 15 to 30 % by weight | and impurities resulting from the raw materials.

1 Claim, No Drawings

PROCESS FOR TREATING SILICON AND FERROSILICON WITH SLAG

The invention relates to a process for treating elemental silicon and ferrosilicon with a molten slag.

It is known from DE-OS No. 27 06 175 to introduce silicon into a slag that contains, in addition to from 2 to 30% by weight of calcium oxide, from 5 to 35% by weight of magnesium oxide, from 0.5 to 28% by weight of aluminum oxide and from 45 to 70% by weight of silicon oxide, at least 0.29% by weight of copper, calculated on the amount of silicon to be treated. In accordance with that process, it was possible to recover fine silicon dust, which is formed when lump silicon is comminuted. Disadvantageously, the silicon obtained in that manner could not be used as a raw material in the semiconductor sector because for that application even a few hundredths of a percent of copper in the silicon is unfavorable.

It is, therefore, an object of the present invention to provide a process for treating silicon and ferrosilicon which, while retaining the advantages of the process known from DE-OS No. 27 06 175, avoids the disadvantages described above.

It is a more particular object of the invention to find a slag composition with which even finely particulate silicon or ferrosilicon can be obtained as a coherent liquid phase which collects below the surface of the slag, which contains no additional copper and which, nevertheless, ensures a calm melting process that proceeds without turbulence.

It has now been found according to the invention that it is possible to dispense with the addition of copper if a slag having (analytically) the composition indicated below contains $K_2O$.

The invention thus relates to a process for treating silicon or ferrosilicon with a slag that is liquefied or kept in a molten state by means of electrical resistance heating, which process is characterized in that silicon or ferrosilicon is brought into contact with a slag having the following analytical composition:

| | |
|---|---|
| $K_2O$ | from 2 to 13% by weight |
| $Na_2O$ | from 0 to 2% by weight |
| $\Sigma\ K_2O + Na_2O$ | from 2 to 13% by weight |
| $SiO_2$ | from 45 to 72% by weight |
| $Al_2O_3$ | from 0 to 30% by weight |
| $\Sigma\ SiO_2 + Al_2O_3$ | from 60 to 78% by weight |
| CaO | from 0 to 30% by weight |
| MgO | from 0 to 30% by weight |
| $\Sigma$ CaO + MgO | from 15 to 30% by weight |
| $CaF_2$ | from 0 to 10% by weight |
| $MgF_2$ | from 0 to 10% by weight |
| $\Sigma\ CaF_2 + MgF_2$ | from 0 to 10% by weight |
| $\Sigma$ CaO + MgO + $CaF_2$ + $MgF_2$ | from 15 to 30 % by weight | and impurities resulting from the raw materials.

The above-mentioned totals are criteria that limit the free choice of the individual components. The proportion of impurities resulting from the raw materials generally lies in the region of from 0.1 to 1.5% by weight. All the percentages by weight total 100% by weight for each specific slag composition.

The following slag composition is preferred for melting down finely particulate silicon having more than 97% of silicon:

| | |
|---|---|
| $K_2O$ | from 4 to 10% by weight |
| $Na_2O$ | from 0 to 2% by weight |
| $\Sigma\ K_2O + Na_2O$ | from 4 to 10% by weight |
| $SiO_2$ | from 62 to 72% by weight |
| $Al_2O_3$ | from 2 to 10% by weight |
| $\Sigma\ SiO_2 + Al_2O_3$ | from 64 to 78% by weight |
| CaO | from 2 to 25% by weight |
| MgO | from 2 to 25% by weight |
| $\Sigma$ CaO + MgO | from 16 to 27% by weight |
| $CaF_2$ | from 0 to 5% by weight |
| $MgF_2$ | from 0 to 5% by weight |
| $\Sigma\ CaF_2 + MgF_2$ | from 0 to 5% by weight |
| $\Sigma$ CaO + MgO + $CaF_2$ + $MgF_2$ | from 16 to 27% by weight | and impurities resulting from the raw materials.

Before being used in the process according to the invention, the slags according to the invention may be either in the form of mixtures of the individual components or in the form of premelted powders.

As ferrosilicon there is used especially FeSi having an iron content of from 10 to 25% by weight. The silicon preferably has a degree of purity of at least 97% by weight.

The treatment of the silicon or ferrosilicon is carried out according to the methods known, per se. For example, lump or finely particulate silicon or ferrosilicon dust having particle sizes of less than 50 μm, can be introduced into the molten slag according to the invention. The lump or finely particulate silicon or ferrosilicon becomes molten after introduction into the slag, a liquid two-phase system being formed with a lower layer of molten silicon or ferrosilicon upon which the slag melt floats.

The ratio of the amount of slag to the amount of silicon or ferrosilicon to be melted down is advantageously from 0.7 to 1.7:1 part by weight.

As the apparatus for carrying out the process, it is preferable to use electrical resistance furnaces having a packed carbon lining and one or more graphite electrodes. The graphite electrodes dip into the slag. The slag resistance-heated in this manner is maintained at a temperature above the melting point of silicon or ferrosilicon. Typically, the temperature is from 1500° to 1800° C., and, preferably, from 1600° to 1700° C.

Surprisingly, the slag according to the invention, even without the addition of copper, has no emulsifying properties with respect to the silicon or ferrosilicon. As a result, the build-up of a relatively high silicon or ferrosilicon content within the slag, which would result in short-circuits in the resistance heating system, is prevented.

As a result of the described slag treatment, it is possible, for example, to recover extremely fine silicon dust, which is formed as a waste product when lump silicon is comminuted to form a low-dust granulation. Furthermore, the slag treatment according to the invention achieves a purifying effect which relates especially to the content of calcium and aluminum in the silicon or ferrosilicon, which is undesirable, per se.

It also lies within the scope of the invention to treat molten silicon or ferrosilicon, such, for example, as is formed as a tapped product from a reduction furnace, with slag according to the invention. In order to carry out this embodiment of the process, molten silicon or ferrosilicon is, e.g., run off from a reduction furnace into a furnace as described above. In this furnace, there is located slag having the composition according to the invention which has been melted and kept warm by means of electrical resistance heating. After being poured into the described furnace, the liquid silicon or ferrosilicon collects below the layer of slag and is freed of the aluminum and calcium impurities by reaction with the slag. The silicon or ferrosilicon is subsequently run off into a preheated ladle and poured into pigs or plates.

introduced into the melt. Calm furnace operation was observed, without any slag or silicon being thrown out of the melt. After 5 hours all the solid constituents had melted. The temperature of the melt was 1650° C. Finally, the silicon melt that had run together was tapped off. The yields and the purification effect can be seen in the following table:

TABLE 1

| Example | Composition of the slag used plus impurities resulting from the raw materials | | | | | | | Analysis values of the silicon plus impurities resulting from the raw materials | | | | | | Yield in % |
| | $SiO_2$ | $Al_2O_3$ | CaO | MgO | $K_2O$ | $Na_2O$ | $CaF_2$ | before melting | | | after melting | | | |
| | | | | | | | | Fe | Al | Ca | Fe | Al | Ca | |
| 1 | 67.1 | 3.1 | 2.8 | 20.2 | 5.2 | 1.2 | — | 0.45 | 0.56 | 0.13 | 0.47 | 0.04 | 0.01 | 93.2 |
| 2 | 65.2 | 5.3 | 3.5 | 15.5 | 8.1 | 1.5 | — | 0.64 | 0.50 | 0.11 | 0.67 | 0.05 | 0.01 | 92.5 |
| 3 | 71.5 | 5.2 | 3.3 | 13.5 | 3.9 | 1.4 | — | 0.52 | 0.41 | 0.10 | 0.55 | 0.05 | 0.01 | 91.8 |
| 4 | 64.3 | 9.6 | 6.2 | 14.1 | 4.8 | 0.2 | — | 0.50 | 0.65 | 0.19 | 0.55 | 0.13 | 0.04 | 94.2 |
| 5 | 66.0 | 3.7 | 13.3 | 11.4 | 3.7 | 0.5 | — | 0.46 | 0.45 | 0.12 | 0.63 | 0.06 | 0.06 | 93.6 |
| 6 | 69.3 | 6.3 | 9.8 | 7.7 | 5.5 | 0.9 | — | 0.43 | 0.52 | 0.20 | 0.51 | 0.05 | 0.03 | 94.4 |
| 7 | 62.8 | 6.9 | 21.7 | 2.2 | 5.3 | 0.1 | — | 0.83 | 0.45 | 0.14 | 0.85 | 0.05 | 0.09 | 91.5 |
| 8 | 70.3 | 6.8 | 2.6 | 7.6 | 4.3 | 0.7 | 6.9 | 1.04 | 0.82 | 0.11 | 1.07 | 0.04 | 0.05 | 92.7 |
| 9* | 67.8 | 4.3 | 6.8 | 9.3 | 6.2 | 0.4 | — | 1.20 | 0.59 | 0.13 | 1.26 | 0.06 | 0.01 | 93.5 |

*The slag used in Example 9 contains, in addition to the components given above, 4.2% by weight of $MgF_2$.

In a different embodiment of the process, the molten silicon or ferrosilicon is run off from the reduction furnace into a preheated ladle of a so called ladle furnace and then covered with slag according to the invention. On so doing, the slag becomes molten and forms a coherent protective layer over the liquid silicon or ferrosilicon that has been run off. The temperatures necessary for maintaining the system in a liquid state are maintained by resistance heating of the slag and electric arc heating. These treatment methods likewise achieve the above-described purifying effect.

In the last-mentioned embodiments of the process, the ratio of the amount of slag to the amount of silicon and ferrosilicon treated is advantageously from 0.05 to 0.3:1 part by weight.

The slags according to the invention also have the advantage over the slags known from DE-AS 27 06 175 of higher service lives. While the previously known slags could be re-used up to 20 times, it is possible with the slags according to the invention to carry out up to 35 run-offs. Furthermore, there is achieved a surprising increase in yields from an average of 90% by weight of finely particulate silicon used according to the previously known process to an average of 93% by weight with the process according to the invention.

The invention will now be described in more detail by way of several examples, which are given by way of illustration and not of limitation:

EXAMPLES 1 to 8

In each case 3.5 tons of the slags listed in the following Table 1 were melted down in an electrical resistance furnace having a packed carbon lining and graphite electrodes. Thereafter, 2.7 tons of silicon dust were EXAMPLES 9 to 14

The procedure according to Examples 1 to 8 was repeated except that, instead of elemental silicon, ferrosilicon was used.

The results can be seen in the following Table 2.

TABLE 2

| Example | Composition of the slag used plus impurities resulting from the raw materials | | | | | | | Analysis values of the Fe Si plus impurities resulting from the raw materials | | | | | |
| | $SiO_2$ | $Al_2O_3$ | CaO | MgO | $K_2O$ | $Na_2O$ | $CaF_2$ | before melting | | | after melting | | |
| | | | | | | | | Fe | Al | Ca | Fe | Al | Ca |
| 1 | 68.2 | 2.5 | 15.7 | 10.5 | 2.2 | 0.5 | — | 21.2 | 1.42 | 1.74 | 21.8 | 0.54 | 0.27 |
| 2 | 64.0 | 7.7 | 27.5 | 8.0 | 2.4 | 0.1 | — | 21.76 | 4.71 | 1.24 | 23.12 | 0.91 | 0.19 |
| 3 | 53.9 | 17.3 | 18.1 | 6.4 | 2.9 | 0.2 | — | 22.71 | 4.17 | 1.56 | 22.99 | 0.92 | 0.32 |
| 4 | 45.4 | 24.4 | 20.7 | 5.3 | 2.2 | 0.6 | — | 24.53 | 5.15 | 1.20 | 25.34 | 1.74 | 0.30 |
| 5 | 46.1 | 28.1 | 18.3 | 3.8 | 2.1 | 0.1 | — | 20.83 | 4.28 | 1.74 | 22.62 | 1.59 | 0.36 |
| 6 | 62.5 | 10.8 | 10.1 | 7.3 | 2.5 | 0.3 | 5.2 | 21.61 | 1.41 | 1.76 | 22.03 | 0.33 | 0.21 |

While only several embodiments and examples of the present invention have been described, it is obvious that many changes and modifications may be made thereunto, without departing from the spirit and scope of the invention.

What is claimed is:

1. The process for treating silicon or ferrosilicon with a slag that is liquefied and kept in a molten state by means of electrical resistance heating, comprising the step of bringing at least one of said silicon and ferrosilicon into contact with a slag having the following analytical composition:

| | |
| --- | --- |
| $K_2O$ | from 2 to 13% by weight |
| $Na_2O$ | from 0 to 2% by weight |
| $\Sigma\ K_2O + Na_2O$ | from 2 to 13% by weight |
| $SiO_2$ | from 45 to 72% by weight |
| $Al_2O_3$ | from 0 to 30% by weight |
| $\Sigma\ SiO_2 + Al_2O_3$ | from 60 to 78% by weight |
| CaO | from 0 to 30% by weight |
| MgO | from 0 to 30% by weight |
| $\Sigma\ CaO + MgO$ | from 15 to 30% by weight |
| $CaF_2$ | from 0 to 10% by weight |
| $MgF_2$ | from 0 to 10% by weight |
| $\Sigma\ CaF_2 + MgF_2$ | from 0 to 10% by weight |
| $\Sigma\ CaO + MgO + CaF_2 + MgF_2$ | from 15 to 30% by weight | and impurities resulting from the raw materials.

* * * * *